United States Patent [19]

Billington et al.

[11] Patent Number: 5,575,378

[45] Date of Patent: Nov. 19, 1996

[54] TRANSFER METHOD AND APPARATUS THEREFOR

[75] Inventors: Alan J. Billington, Cottam; Stephen C. N. Brown, Goosnargh; Barry Snelson, Garstang; Joseph H. Drayton, Freckleton; Stephen A. Wood, Blackpool; Paul H. Desborough, Inskip; Stuart Slater, Blackburn, all of United Kingdom

[73] Assignee: British Nuclear Fuels plc, Warrington, United Kingdom

[21] Appl. No.: 354,725

[22] Filed: Dec. 6, 1994

Related U.S. Application Data

[63] Continuation of Ser. No. 137,889, Sep. 24, 1993, abandoned, which is a continuation of Ser. No. 758,451, Sep. 6, 1991, abandoned, which is a continuation of Ser. No. 406,102, Sep. 12, 1989, abandoned.

[30] Foreign Application Priority Data

| Sep. 12, 1988 | [GB] | United Kingdom | 8821368 |
| Dec. 7, 1988 | [GB] | United Kingdom | 8828597 |
| Aug. 16, 1989 | [GB] | United Kingdom | 8918651 |

[51] Int. Cl.$^6$ ............................................. B65G 27/00
[52] U.S. Cl. ............................................................ 198/771
[58] Field of Search ................................... 198/443, 453, 198/454, 755, 771, 772

[56] References Cited

U.S. PATENT DOCUMENTS

| 3,667,590 | 6/1972 | Mead | 198/771 |
| 3,835,983 | 9/1974 | Horii | 198/755 |
| 3,841,471 | 10/1974 | Mead | 198/771 |
| 3,929,221 | 12/1975 | Armstrong | 198/771 |
| 3,995,733 | 12/1976 | Mead | 198/776 |
| 4,037,710 | 7/1977 | Brutcher | 198/771 |
| 4,068,029 | 1/1978 | Armstrong | 198/771 |

*Primary Examiner*—Joseph E. Valenza
*Attorney, Agent, or Firm*—Nixon & Vanderhye P.C.

[57] ABSTRACT

A method and apparatus for transferring relatively light objects. The objects are supported on a cushion element having a multiplicity of extremely fine and relatively short flexible fibers packed at an ultra high density pile in a backing. The fibers are aligned at an angle or inclination with respect to the base so that when the cushion element or the object is vibrated the objects are transferred in the direction of lay of the fibers.

The cushion element may be supported by a base with the object resting on the fibers, or the cushion element may be secured to the underside of the object so that the fibers rest on the base.

35 Claims, 10 Drawing Sheets

TRANSFER METHOD AND APPARATUS THEREFOR

This is a continuation of application Ser. No. 08/137,889, filed Sep. 24, 1993 now abandoned, which is a File Wrapper Continuation of application Ser. No. 07/758,451, filed Sep. 6, 1991, now abandoned, which in turn is a File Wrapper Continuation of application Ser. No. 07/406,102, filed Sep. 12, 1989, now abandoned.

This invention relates to a method and to an apparatus for transferring an object, and more particularly but not exclusively to the transfer of a relatively light object such as a relatively small fragile object.

One example of a transfer apparatus is described in British Patent Specifications Nos 1321191 and 1390564. This apparatus relies on the objects to be transferred being supported by the tips of bristles, and subsequent vibration of the bristles in a controlled manner to cause the objects to move in a controlled manner.

According to one aspect of the present invention there is provided a method of transferring a relatively light object, the method comprising supporting the object on at least one cushion element comprising a multiplicity of extremely fine and relatively short flexible synthetic polymer fibres packed at an inclined orientation as an ultra high density pile in a backing, and vibrating the fibres so as to transfer the object in the direction of inclination of the fibres.

According to another aspect, the invention provides an apparatus for performing the aforesaid method of the invention, the apparatus comprising a support member, a cushion element locatable on the support member, the cushion element comprising a multiplicity of extremely fine and relatively short flexible synthetic polymer fibres, said fibres being packed at an inclined orientation as an ultra high density pile and secured in a plastics backing, and means for vibrating the fibres, so that in operation a relatively light object supported by the fibres of the cushion element is transferred in the direction of inclination of the fibres.

Preferably, the ultra high density pile is between 68 and $80 \times 10^6$ fibres per square meter, and may have a fibre length/thickness ratio of the order of 50:1. Advantageously the fibres have a thickness of between 43 to 45 microns, and a length of up to 2.5 mm. Desirably, the fibres comprise Nylon 66, and the backing comprises a glass fibre reinforced vinyl layer.

Preferably, the fibres are inclined in the backing at an orientation of at least 70° from the backing, desirably of about 80° from the backing.

The direction of the vibrations may be aligned with, or normal to, or inclined to, the required direction of transfer of the object. Conveniently, the fibres may be vibrated by vibrating the support member, or by vibrating the object. Preferably, the frequency of the vibrations is between 50 and 100 Hz, and may have a vertical peak-to-trough displacement of about 0.5 mm.

Several cushion elements may be provided, a base said cushion element and at least one relatively small carrier said cushion element locatable on the base cushion element, the carrier cushion element having said ultra high density pile of said fibres on both sides thereof, whereby an object on one side of the carrier cushion element is transferred in the direction of inclination of the fibres in said one side when the base cushion element is vibrated.

The support member may comprise one part of complementary interengageable strips, the other said strip being affixed to the backing of the or each said cushion element. The strips may comprise magnetic material, or may comprise complementary hooks and loops comprising plastics material for interlocking when the strips are pressed together.

A plurality of portions of said cushion element may be located on a flat support member, the directions of inclination of the fibres in the portions being arranged so that objects on the portions follow a predetermined path.

The cushion element may be of arcuate form with the fibres thereof uppermost, the cushion element being pivoted laterally about one end thereof so as to cause the object to roll up the sides of the cushion element and thereby vibrate the fibres, the direction of inclination of the fibres in the cushion element being aligned generally in a direction away from the pivoted said one end.

The cushion element might be secured to the underside of the object such that the fibres of the cushion element contact and are supported by a base or by the support member. Conveniently a drag may be applied to the base or the support member from a portion of the object to cause the object to change direction.

In one form of the apparatus of invention, the support member comprises a V-shaped track having a said cushion element on each side thereof. One of the cushion elements on one side of the track may have said fibres thereof with a direction of inclination aligned with the length of the track, and the other said cushion element on the other side of the track may have the direction of inclination of said fibres thereof aligned angularly with respect to the length of the track, or both said cushion elements may have the fibres thereof aligned in the same direction.

In one application of the invention there is provided an inspection system, the system comprising an apparatus of the one form of the invention having on one side thereof a light source for projecting a beam onto an object on the track, and on the other side thereof a receiver for detecting light from the light source.

In another application of the invention a rotatable wheel may be disposed above the cushion element and spaced therefrom, the direction of inclination of the fibres in the cushion element being towards the wheel, and the spacing and the direction of rotation of the wheel being such that in operation objects of an acceptable height are diverted from the cushion element by the wheel whilst objects of lower height on the cushion element are able to pass under the wheel.

The invention may also be used for orientating cylindrical objects in which the support member defines an angular trough, the trough having a flat one side thereof at a relatively low angle, a side wall at the upper end of said one side, a cushion element on said one side having the fibres thereof inclined angularly towards the side wall and towards an exit at one end of the trough, and the other side of the trough having a cushion element with the fibres thereof inclined towards the exit end, and a feed cushion element at the other end of the trough near the upper end of the one side, the feed cushion element having the fibres thereof inclined towards the one side for feeding cylindrical objects on to the one side. A lower step may be provided at the exit end at the junction between the one side and the other side for re-orientating those said cylindrical objects transferred along said junction, return cushion elements being provided having the fibres thereof aligned so as to transfer said re-orientated cylindrical objects from the lower step to the feed cushion element.

In yet another application of the invention the support member may comprise a Tee-shaped channel having cushion elements locatable on the base of the channel, one said cushion element being locatable at the junction between a stem portion and arm portions of the channel, the one said cushion element having the fibres thereof inclined in a direction away from the stem portion, the arm portions having the cushion elements thereof with their fibres inclined towards the one said portion, and the stem portion cushion element having the fibres thereof inclined away from the one portion, and three actuating means locatable outside the channel and each for displacing a respective plunger into the channel, one said actuating means being locatable so as to displace the plunger thereof generally centrally across the one said cushion element, and the other said actuating means being locatable one either side of the one said actuating means and positioned such as to partially close a respective said arm portion with the plunger thereof extended, whereby objects in the arm portions and released by the respective side actuating means to the one said cushion element may be pushed by the central actuating means plunger across the one said cushion element to the stem portion cushion element. Sensing means may be provided above the one said cushon element for detecting the presence of an object on the one said cushon element.

A non-linear movement of the object may be produced by the invention. For example, a plurality of cushion elements may be located around a pivot means with an object in the form of a rotary member rotatably located on the pivot means, the inclination of the fibres of the cushion elements being aligned-with respect to each other such as to impart a rotary motion to the rotary member when the cushion elements are vibrated by the vibrating means.

The invention as herein described has advantages over the transfer apparatus described in the aforementioned British Patent Specifications in that it does not use bristles. The soft cushion element of the invention with its ultra high density pile ensures that the extremely fine flexible fibres are buttressed by adjacent fibres in order to support objects to be transferred. The synthetic polymer material of the fibres and their relatively short length provide sufficient inherent elastic recovery of the fibres so that they return to their original angle of inclination to a substantial extent when relieved of the weight of the objects. Hence relatively fragile objects can be transferred smoothly without damage, in that although some jostling of objects on the cushion element may occur there should be no serious impact or abrasion likely to cause local damage to objects.

The invention will now be further described by way of example only with reference to the accompanying drawings, in which.

Figure 1:
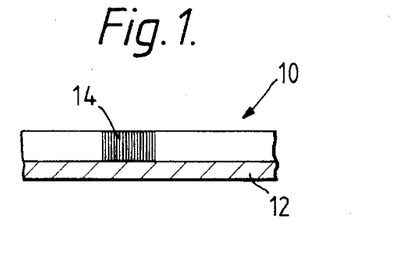
FIG. 1 shows a sectional representation of a portion of a cushion element.

Referring now to FIG. 1, a cross-sectional view of a portion of a cushion element 10 is shown to an enlarged scale, and comprises a glass fibre reinforced vinyl base 12 and extremely fine synthetic polymer fibres 14 (e.g. Nylon 66) integrated at one end in the base 12. The fibres 14 are shown spaced apart for clarity but are packed at an ultra high density pile in the base 12 and at an angle of inclination with respect to the base of between 75° to 80°. The packing density of the fibres 14 is of the order of $80 \times 10^6$ fibres per square meter, and each fibre 14 is between 43 to 45 microns thick and projects up to 2.5 mm above the base 12.

Figures 2, 3A, 3B, 3C, 3D:
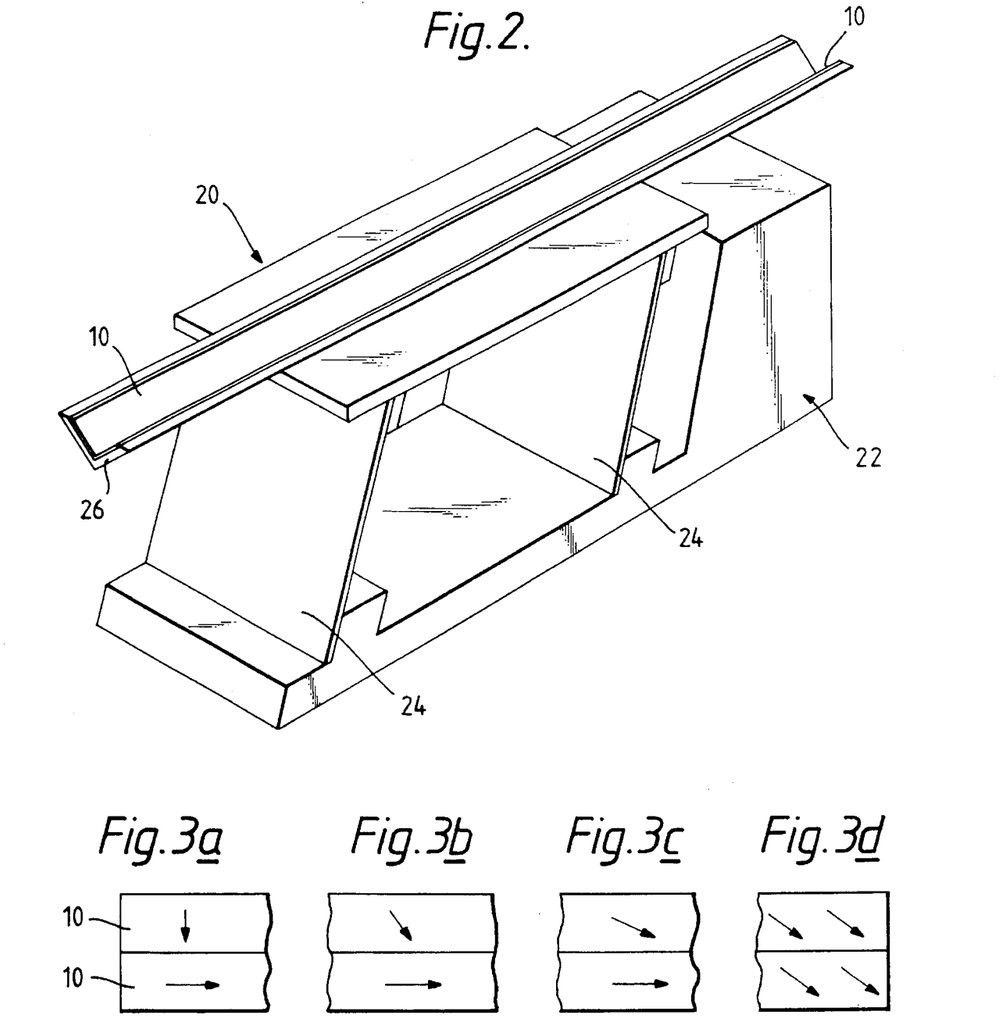
FIG. 2 shows a perspective view of an apparatus for transferring objects.
FIGS. 3a, 3b, 3c and 3d shows plan views of portions of cushion elements for the apparatus of FIG. 2.

Referring now to FIG. 2, a transfer apparatus 20 is shown and comprises a vibratory actuator 22 arranged to vibrate two flexible supports 24 which carry a 'V'-shaped support member 26 upon which two strips of cushion elements 10 are affixed. When the vibratory actuator 22 is engaged an object (not shown) is transferred along the support member 26. As shown in FIGS. 3a, 3b, 3c and 3d in which the arrows represent directions of inclination of the fibres 14 (not shown), appropriate choice of an angular direction of inclination for the cushion elements 10 can produce rotation of an object along the support member 26. Such rotation can have an application for inspection purposes, as shown in FIG. 4 to which reference is made.

Figure 4:
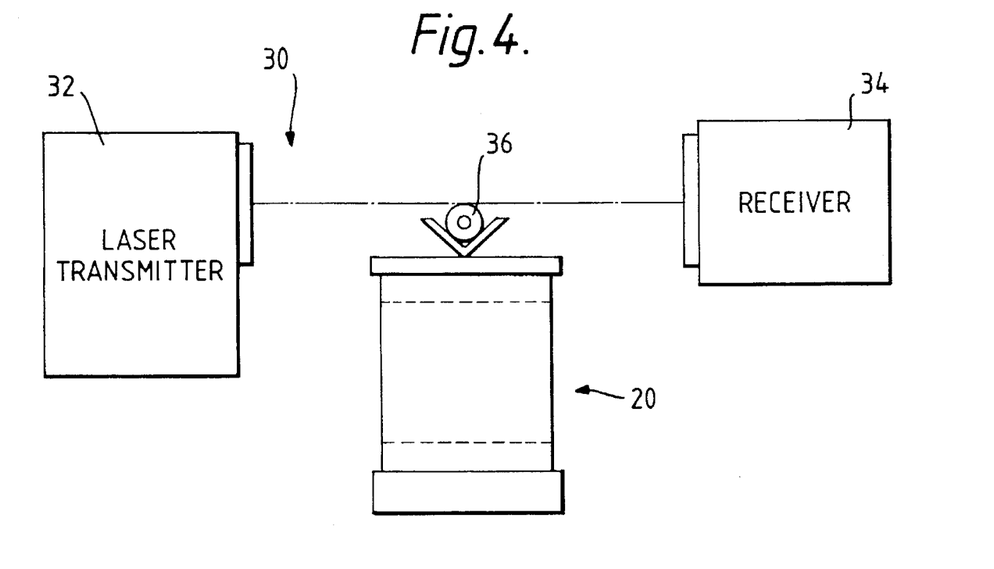
FIGS. 4 and 5 show diagrammatic representations of inspection apparatus including the apparatus of FIG. 2.

In FIG. 4 an inspection apparatus 30 is shown, and comprises the apparatus 20 of FIG. 2 with on one side a laser transmitter 32 which transmits a progressive series of parallel light beams in a horizontal path about 8 cm wide which are detected by a receiver 34. As the apparatus 20 transfers and rotates a cylindrical object 36 the light beams are partially interrupted by the object 36 so that the length of the object 36 can be deduced from the light detected by the receiver 34. By changing the angle of alignment of the transmitter 32 and the receiver 34 with respect to the longitudinal axis of the object 36, for example to highlight the corners of the object 36, chips in the corners can be detected from the apparent change in the length of the object 36 detected by the receiver 34.

Figure 5:
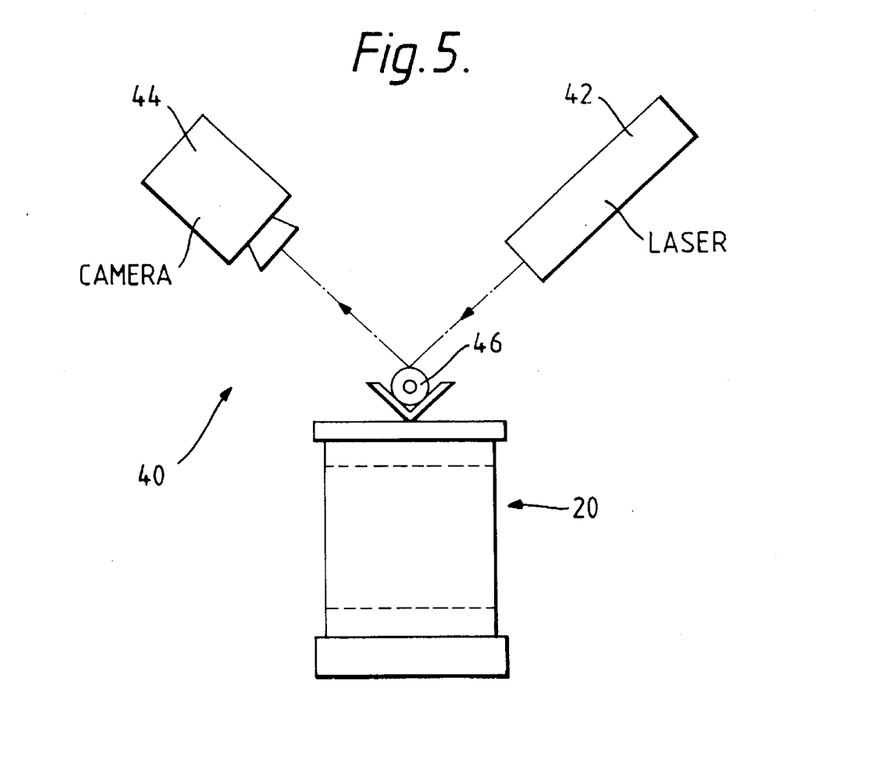

Another inspection apparatus 40 is shown in FIG. 5, in which the apparatus 20 of FIG. 2 has on one side a laser transmitter 42 and on the other side a linescan camera 44 disposed angularly with respect to each other. The light beam from the transmitter 42 is reflected by the cylindrical surface of an object 46 as it rotates and transfers along the apparatus 20, and is recorded by the camera 44. Any defects in the cylindrical surface result in changes in the reflected light received by the camera 44, which enables such defects to be detected and analysed.

In both FIG. 4 and FIG. 5, use of the invention enables a fairly simple transfer apparatus to be used to produce simultaneous translation and rotation in contrast with conventional mechanical conveyors such as rollers or belts. If spacing of objects is required, a small bump could be raised at the lower junction of the cushion elements 10, to introduce a-slight hesitation in the movement of each object as it passes along the cushion element 10. A similar hesitation can be achieved by changing the direction of inclination of the fibres.

Figure 6:
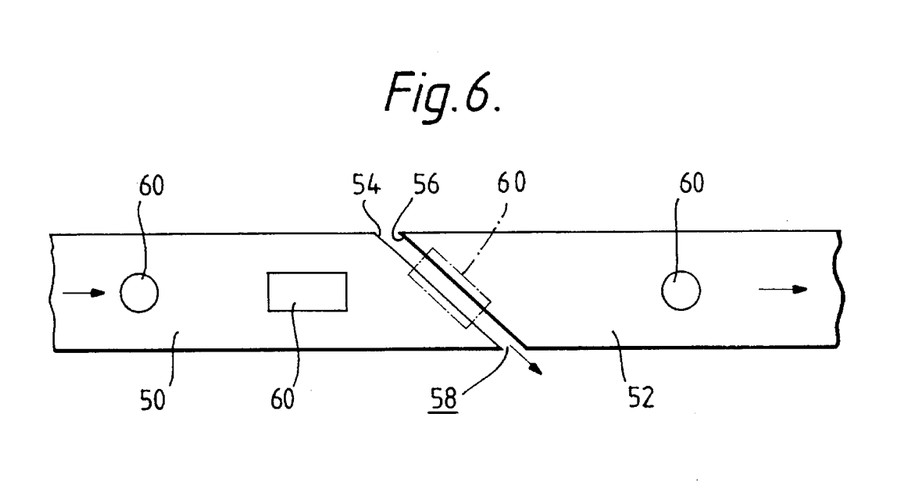
FIGS. 6 and 7 show diagrammatic representations of applications of the cushion element of FIG. 1.

The invention has other applications in sorting operations, for example in rejecting misaligned objects as shown in FIG. 6.

In FIG. 6 two flat cushion elements 50, 52 respectively are shown in longitudinal alignment but have adjacent inclined edges 54, 56 to define a narrow gap 58 (e.g. 3 mm). The direction of inclination of the fibres in the cushion elements 50, 52 is shown by the arrows, so that when the cushion elements 50, 52 are vibrated objects are transferred from left to right as shown. Cylindrical pellets 60 are shown either upright or lying on one side. The effect of the gap 58 is that only upright pellets 60 are able to cross the gap 58, whilst other pellets 60 (shown in broken line) are rejected by being moved along the direction of the gap 58 and ejected from the cushion elements 50, 52.

By suitable selection of strips of cushion elements with fibres having particular directions of inclination, objects can be arranged to move in a desired direction and at different speeds, an example being shown in FIG.

Figure 7:
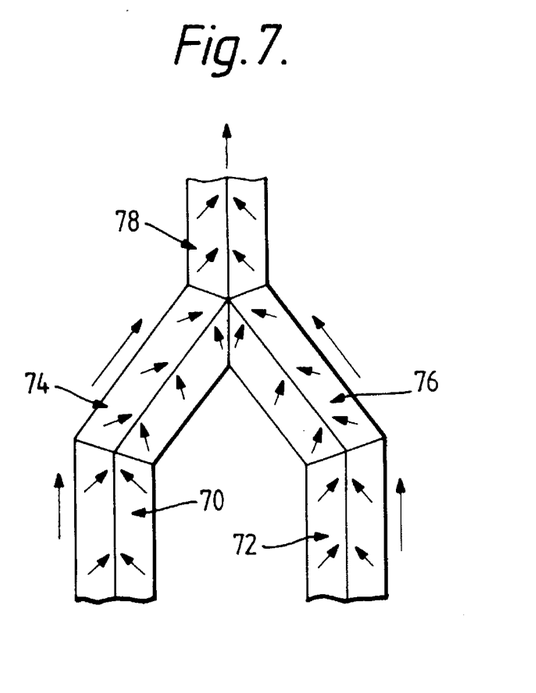

In FIG. 7 two parallel lines of flat cushion elements 70, 72 are joined by angular cushion elements 74, 76 to a single cushion element 78. The directions of inclination of the fibres in the cushion elements 70 . . . 78 are shown by the arrows, each cushion element 70 . . . 78 being constituted by two adjacent cushion element portions. Objects (not shown) being transferred by vibration of the cushion elements 70 . . . 78 are eventually combined into a single stream of objects on the cushion element 78. It is necessary for the transfer velocity of the cushion element 78 to be set in relation to the transfer velocity of the cushion elements 70, 72 to avoid congestion of the objects at the junction of the cushion elements 74, 76, 78. Other more intricate movement of objects can be arranged by appropriate combinations of cushion elements having particular directions of inclination of the fibres. For example, square or hexagonal paths of cushion elements can be provided with adjacent cushion elements having directions of inclination arranged to confine objects to the predetermined square or hexagonal path. This may have applications for the display of objects.

Figure 8:
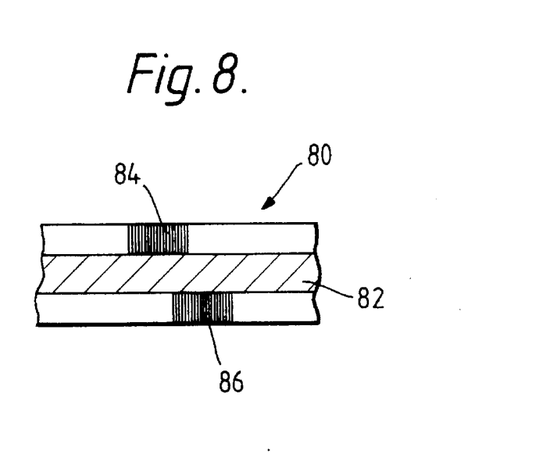
FIGS. 8 and 9 show diagrammatically carrier cushion elements on a base cushion element.
Figure 9:
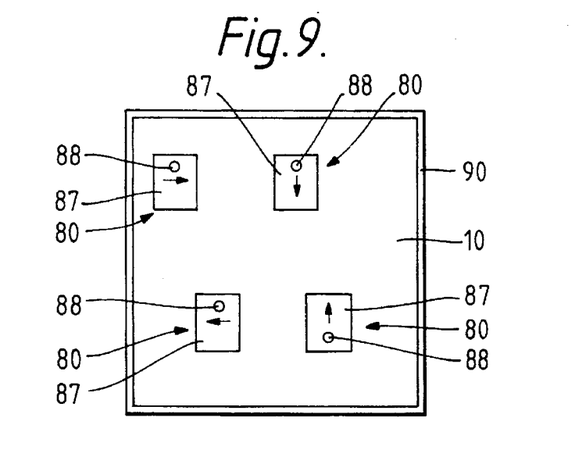

It is possible for objects to be transferred in a variety of directions on a base cushion element having a single direction of inclination of fibres as shown in FIGS. 8 and 9.

In FIG. 8 a carrier cushion element 80 is shown to an enlarged scale in section having a central backing 82 and extremely thin synthetic polymer fibres 84, 86 respectively on either side of the backing 82. Referring now to FIG. 9, a frame 90 retains a base cushion element 10 of FIG. 1 having fibres which can be in any direction of inclination. A number of carrier cushion elements 80 (only four are shown) of FIG. 8 in the form of rectangular tiles 87 are positioned on the base cushion element 10 with the fibres 86 resting on the base cushion element 10 and the direction of inclination of the fibres 84 of each tile 87 shown by appropriate arrows.

Objects 88 are placed on the tiles 87, and vibration of the base cushion element 10 results in the vibrations from the cushion element 10 being communicated through the fibres 86 to the fibres 84 of the tiles 87. The tiles 87, therefore, move the objects 88 in the directions of the arrows shown on the tiles 87 irrespective of the direction of inclination of the fibres in the base cushion element 10, whilst the tiles 87 remain substantially stationary. If a tile 87 is lifted and turned and replaced on the base cushion element 10, the object 88 on that tile 87 will move in the new direction of inclination of the fibres 84 of the tile 87. Hence intricate movements can be produced and changed quite readily.

Figure 10:
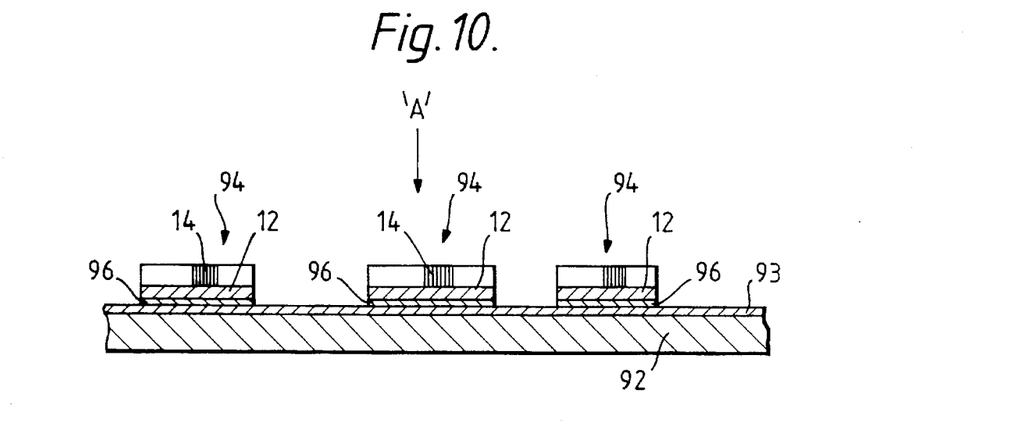
FIG. 10 shows a sectional representation of several cushion elements in a support member.

Another arrangement similar in some respects to that of FIGS. 8 and 9 is shown in FIG. 10.

Figure 11:
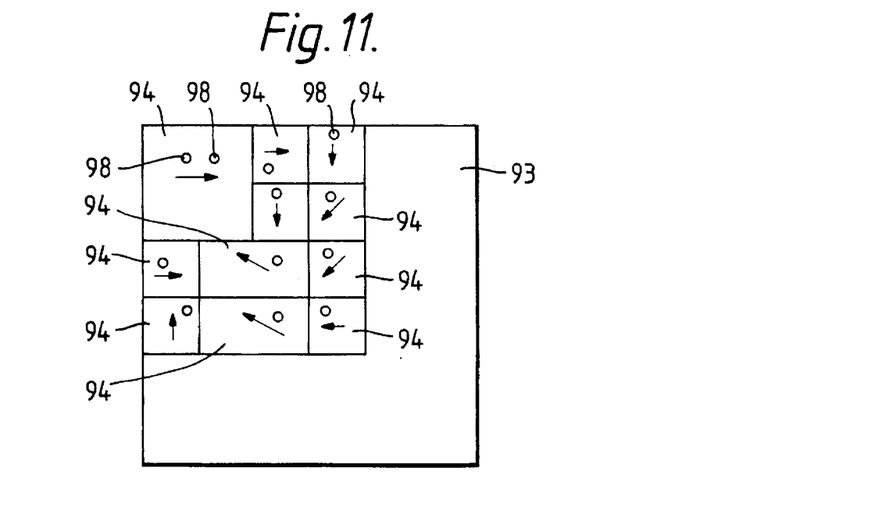
FIG. 11 shows a view in the direction of arrow 'A' of FIG. 10 to a reduced scale.

In FIG. 10, a non-magnetic platform 92 (e.g. wood) carries a magnetic flat support member 93 upon which several cushion elements 94 locate. Each cushion element 94 has fibres 14 integrated into a base 12 which is affixed to a magnetic strip 96. Each magnetic strip 96 locates the respective cushion element 94 onto the support member 93, with the inclination of the fibres 14 in the cushion elements 94 in selected directions. Vibration of the support member 93 via the platform 92 vibrates the fibres 14 in each cushion element 94, so that objects (not shown) on the cushion elements 94 are transferred in the direction of inclination of the fibres 14 in the respective cushion element 94. It will be apparent that any of the cushion elements 94 may be lifted, turned and then replaced on the support member 93 to arrange that objects thereon are transferred in a different direction. Examples of material suitable for magnetic support members 93 and strips 96 and known as "Magnetic Tiles" may be obtained from: Eclipse Magnetics Limited, Units 1 to 4, MI Distribution Centre, Vulcan Road, Sheffield, S9 1EW, United Kingdom. These Magnetic Tiles are self-adhesive on one side, and may be readily attached to the platform 92, and to the base 12 of each cushion element 94. One arrangement of the cushion elements 94 of several sizes is shown in FIG. 11, in which the directions of inclination of the fibres 14 in the cushion elements 94 produce pre-selected movements of objects 98.

Similar results to that of FIG. 10 may be obtained by substituting interlocking material such as "VELCRO" for the magnetic support member 93 and the magnetic strip 96. VELCRO has complementary nylon strips of hooks and loops for interlocking when the strips are pressed together, but the strips can be readily separated to enable the orientation of a cushion element 94 to be changed.

The cushion elements of the invention should transfer objects whilst immersed in liquid and will operate above ambient temperatures depending on the material of the fibres used. With Nylon 66 and the vinyl backing, temperatures of up to 130° C. may be acceptable. It is surprising that such extremely fine fibres of the invention which are not stiff or bristle-like are able to accept and transfer objects, but this is essentially due to the multitude of short fibres in the pile of the cushion element, which buttress one another to resist collapse and provide elastic biasing for recovery.

The soft handling provided by the cushion elements has particular advantages for transferring light objects, or when frangible or fragile objects have to be transferred, since although the objects may be lightly jostled there need be no serious impact likely to cause chipping or scratching of the objects. Examples of objects that have been transferred satisfactorily include:

EXAMPLES

1. Steel pellets 14.5 mm diameter×15 mm long. Weight 19.3 gms.

2. Ceramic hollow pellets "Frequentite" (which is about 65% silicon):
  i. 18 mm diameter×7.5 mm bore×18.5 mm long. Weight 10.5 gms
  ii. 14.5 mm outside diameter×6.8 mm bore×15 mm long. Weight 5.5 gms.
3. Pellets of uranium dioxide of similar dimensions to 2(i) and 2(ii) above—weight about 22 gms in both the green and the sintered state.
4. Stainless steel hollow end caps for nuclear fuel pins— outside diameter ≃ 14.5 mm×length ≃ 2.5 mm. Weight 2.7 gms.

It can be seen from the Examples that extremely light objects can be transferred satisfactorily, and also objects with friable surfaces. This is a particular advantage for transferring nuclear fuel pellets where damage to the sides or corners of the pellets must be avoided or at least minimised.

Although the preferred fibres are of Nylon 66 in a vinyl base, for example that supplied under the Trade Name "Flotex" by Bonar and Flotex Limited, Ripley, Derby, United Kingdom, other synthetic polymers may be used in alternative bases.

The vibration may be in any direction, and might be selected to align with the required direction of movement. Alternatively, where random directions of movement are required, the vibration might be normal to or inclined to the required directions of movement.

Figure 12:
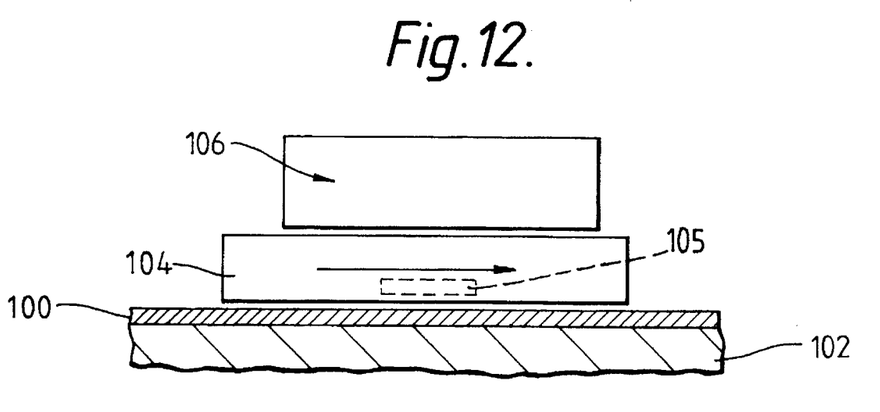
FIG. 12 shows a sectional view of a transfer apparatus.

Referring now to FIG. 12, a cross-sectional view is shown of a wide cushion element 100 supported by a base 102. A carrier 104 square in plan and capable of being vibrated by an internal vibrator 105 is disposed on the cushion element 100, and supports an object 106 to be transferred.

The cushion element 100 is of the kind described in the afore-mentioned FIGS. 1 to 11. As the carrier 104 vibrates, it is moved along in the direction of inclination of the fibres in the cushion element 100 in a manner similar to that afore-described even though the base 102 is not vibrated in the afore-described manner. The direction of inclination of the fibres shown is such as to move the carrier 104 in the direction shown by the arrow.

Figure 13:
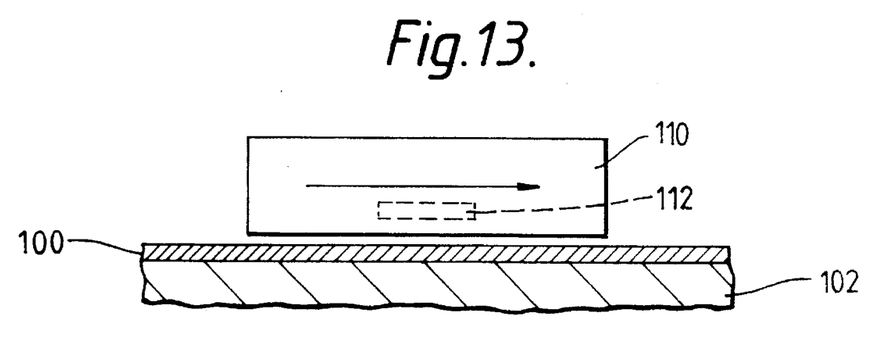
FIG. 13 shows a sectional view of a modification of the transfer apparatus of FIG. 12.

As shown in FIG. 13, the transfer apparatus is similar in many respects to the apparatus of FIG. 12 in having a cushion element 100 supported by a base 102. However, an object 110 is supported on the cushion element 100. The object is capable of being vibrated by a vibrator 112 and, therefore, is transferred in the direction of inclination of the fibres in the cushion element 100, this direction moving the object 110 in the direction shown by the arrow.

Figure 14:
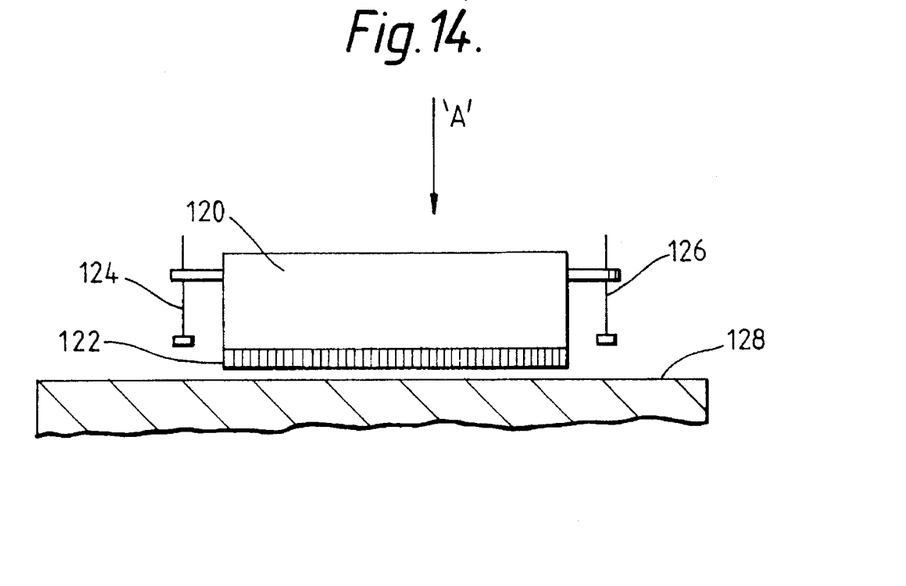
FIG. 14 shows a sectional view of another transfer apparatus.
Figure 15:
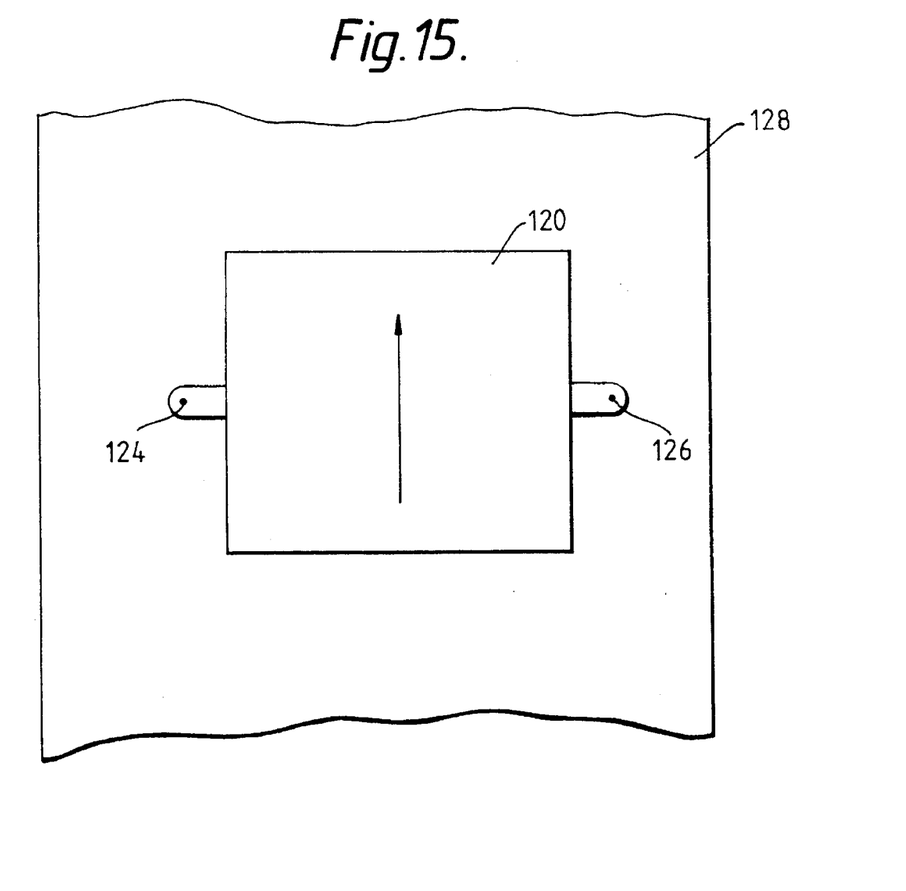
FIG. 15 shows a view in the direction of arrow 'A' of FIG. 14.

Referring now to FIGS. 14 and 15, a carrier 120 which is square in plan has inverted and secured on its underside a portion 122 of the same kind of cushion element 100 as that used in the apparatus of FIGS. 12 and 13. Two retractable drag links 124, 126 respectively locate at the sides of the carrier 120 and can be lowered independently to contact a base 128 on which fibres of the cushion element portion 122 are also supported.

The carrier 120 can be vibrated by an internal vibrator (not shown), which causes the cushion element portion 122 to move in the direction of inclination of the fibres in the portion 122, this direction being shown by the arrow. If a drag link 124 or 126 is lowered to impose a drag on one side of the carrier 120, the carrier 120 is caused to rotate and thereby change direction.

Although a carrier 120 has been shown in FIGS. 14 and 15, an object (not shown) capable of being vibrated could be used instead, with the cushion element portion 122 being secured on the underside of the object.

If a steering capability is not required, the drag links 124, 126 may be dispensed with. Alternatively, other suitable steering elements may be used. It will be understood that carriers of non-square shapes may be used.

It will also be appreciated that the carriers and/or objects are conveniently transferred in a horizontal direction, but other transfer directions are possible.

Figure 16:
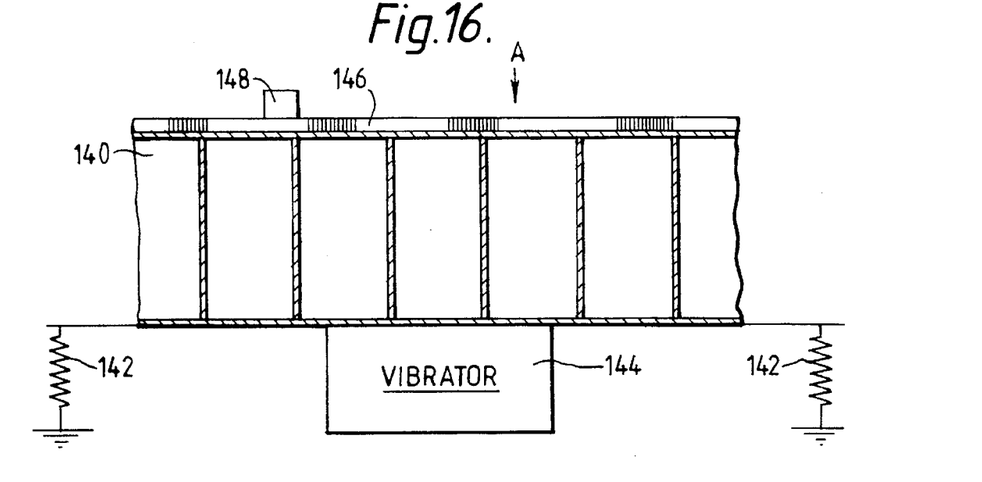
FIG. 16 shows a sectional view of a structure for supporting a cushion element assembly.
Figure 17:
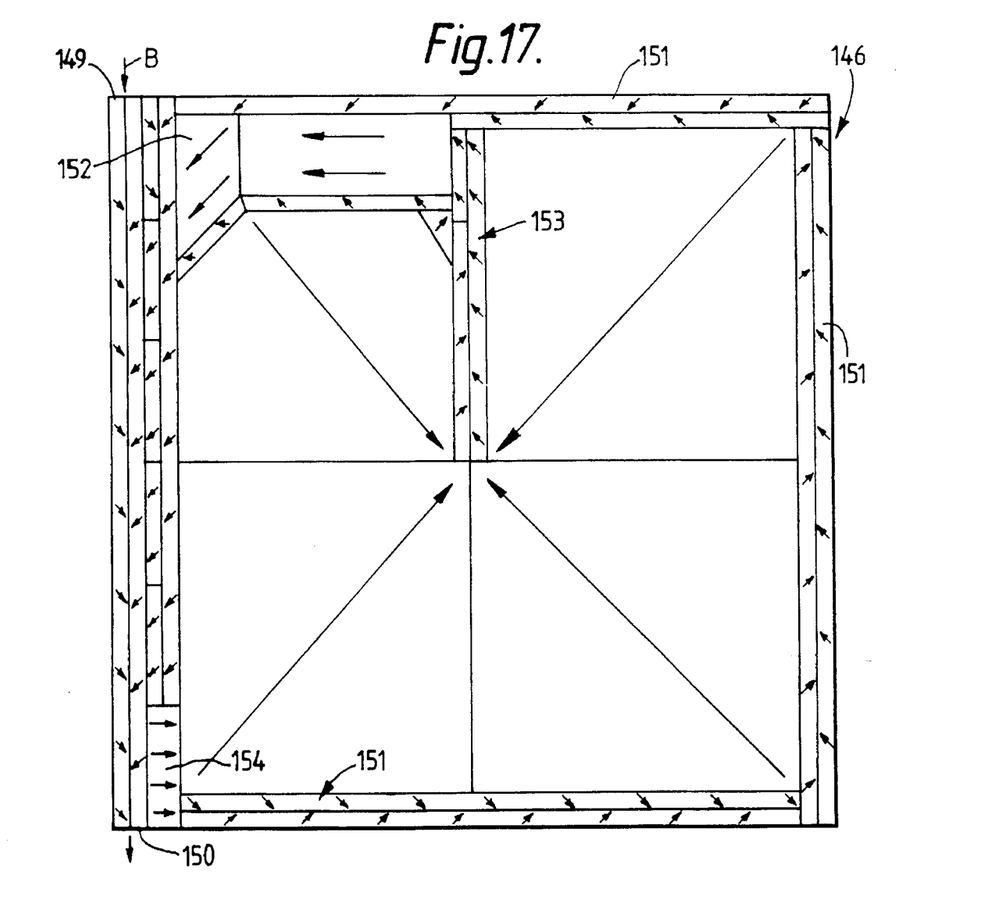
FIG. 17 shows a view in the direction of arrow A of FIG. 16.

In some applications of the invention a large but relatively light structure may be used, for example as shown in FIG. 16. In FIG. 16, a relatively large, lightweight honeycomb aluminium structure 140 is shown mounted on spring supports 142 (only two are shown) and arranged to be vibrated by a vibrator 144 placed at the underside of the structure 140. A cushion element assembly 146 with the fibres uppermost is attached to the top of the structure 140, and supports an object 148. In operation, vibration of the structure 140 by the vibrator 144 vibrates the fibres in the cushion element assembly 146 which thereby transfers the object 148 in the direction of inclination of the fibres. An example of a cushion element assembly 146 is shown in FIG. 17. A large number of individual cushion elements are shown with the direction of inclination of their fibres indicated by the arrows. Objects fed on to the cushion element assembly 146 at an entrance 149 in the direction of arrow B proceed towards an exit at 150. If the exit 150 is blocked for some reason, the objects will proceed along the edges 151 of the assembly 146 to return to exit 150. If the exit 150 remains blocked, the objects continue to circulate and build up on the assembly 146. Cushion elements at 153 feed to the edges 151 objects building up at the centre for recirculation to the exit 150. The direction of inclination of the fibres at 152 inhibits the recirculating objects from interfering with the feed of objects at the entrance 149. The direction of inclination of the fibres and the width of the cushion element at 154 may be arranged to ensure that a single row of objects emerges from the exit 150. Several structures 140 may be placed in series with the exit 150 of one cushion assembly 146 being positioned adjacent to the entrance 149 of an adjacent cushion assembly 146. It may be necessary to provide a bridging cushion element (not shown) with a supporting base (not shown) between the exit 150 and the adjacent entrance 149 of the adjacent cushion element assemblies 146.

Figure 18:
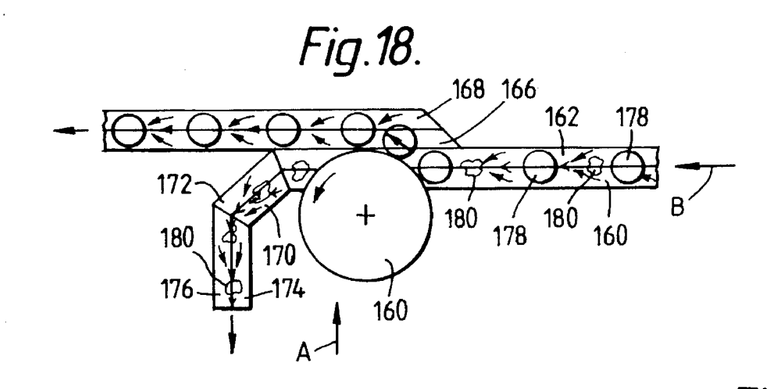
FIG. 18 shows a plan diagrammatic view of a sorting apparatus.
Figure 19:
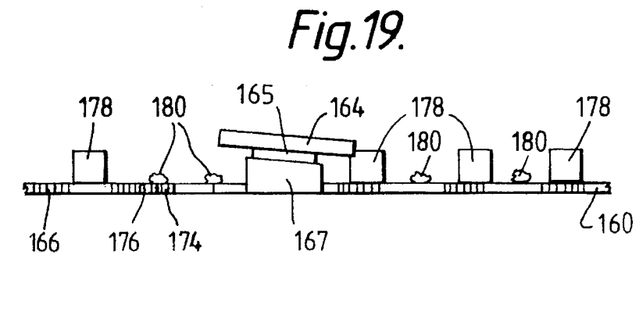
FIG. 19 shows a view in the direction of arrow A of FIG. 18.

A sorting apparatus is shown in FIGS. 18 and 19 in which a pair of longitudinal cushion elements 160, 162 are located below a rotatable disc 164 having an inclined axis of rotation, the disc 164 having its direction of rotation shown by the arrow. An adjacent pair of cushion elements 166, 168 are located at the side of the cushion elements 160, 162 such that the adjacent sides thereof are tangential to the disc 164 in plan. The cushion elements 160, 162 connect to corner pairs of cushion elements 170, 172 and 174, 176. The height of the disc 164 is arranged so that the disc 164 contacts cylindrical objects 178 to be sorted but is above debris 180 that might be present. The directions of inclination of the fibres in each of the cushion elements 160, 162, 166, 168, 170, 172, 174 and 176 are shown by the respective arrows, and the effective direction of feed of the objects 178 is shown by the arrows between adjacent cushion elements 160, 162, 166, 168, 170, 172, 174 and 176. The rotation axis of the disc 164 is inclined in a direction opposite to that of the direction of feed of the cushion elements 160, 162. This assists in freeing any large debris that might tend to jam under the disc 164.

In operation with all the cushion elements 160, 162, 166, 168, 170, 172, 174 and 176 arranged to be vibrated, the objects 178 on the cushion elements 160, 162 are fed in the direction shown by the arrow B towards the inclined rotating disc 164. When the objects 178 meet the rotating disc 164 they are swept by the disc 164 to the cushion elements 166, 168. Any debris 180 on the cushion elements 160, 162 passes under the rotating disc 164 and is transferred onto the cushion elements 170, 172 and subsequently the cushion elements 174, 176 for discharge, thereby sorting the objects 178 and the debris 180 from each other. The disc 164 may be rotated by a rotary device such as an electric motor (not shown), or by an arrangement such as that described in relation to FIGS. 27 to 29.

Figure 20:
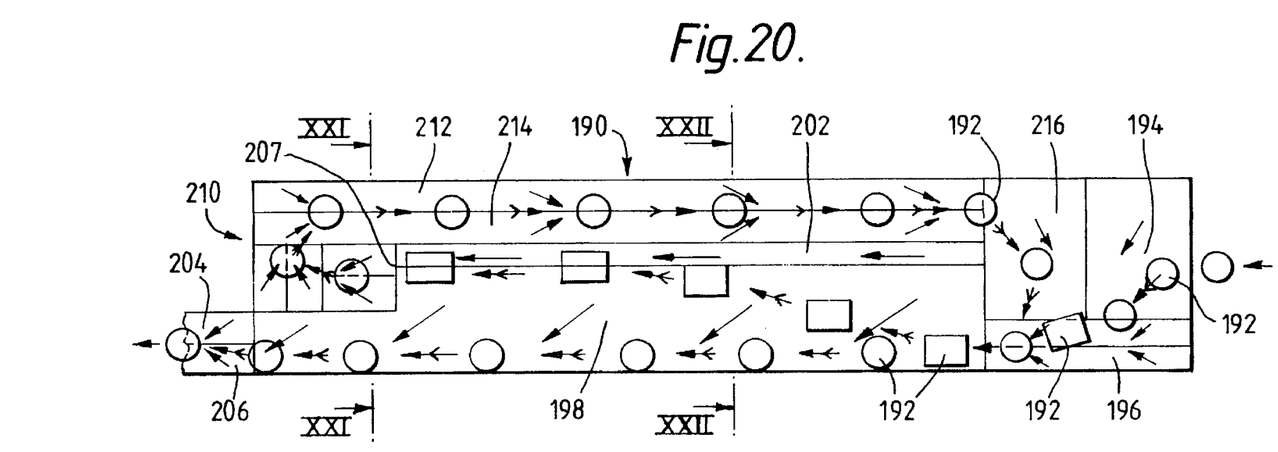
FIG. 20 shows a plan diagrammatic view of a sorting and correcting apparatus.
Figure 21:
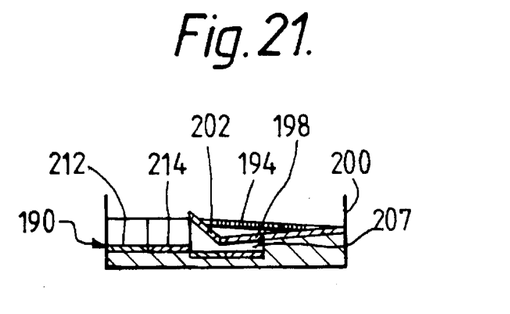
FIG. 21 shows a view on the line XXI of FIG. 20.
Figure 22:
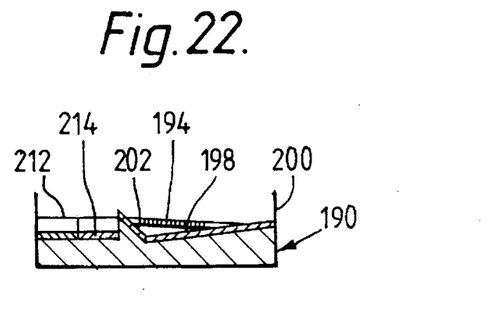
FIG. 22 shows a view on the line XXII of FIG. 20.

An apparatus for sorting and correcting the orientation of cylindrical objects is shown in FIGS. 20–22. In FIG. 20 a number of cushion elements are shown attached to a shaped structure 190. The direction of inclination of fibres in the cushion elements are shown by the single-headed arrows, whilst the direction of transfer of cylindrical objects 192 on the cushion elements are shown by double-headed arrows. An infeed area at 194 slopes slightly downwards towards an object stream feed area 196 which discharges onto a downwardly sloping sorting area 198. At its upper end the sorting area 198 is bounded by an upright wall 200 whilst at its lower end it is bounded by a face 202 set at about 30° to the horizontal.

In operation, the structure 190 is vibrated and cylindrical objects 192 from the infeed area 194 are transferred to the stream feed area 196 from which the objects 192 are discharged into the sorting area 198. Upright objects 192 are transferred by the cushion elements in the sorting area 198 to the upright wall 200 from which the objects 192 are discharged to exit cushion elements 204, 206. Objects 192 lying on their sides in the sorting area 198, roll down towards the junction of the sorting area 198 and the inclined face 202, and are thereby transferred over a step at 207 to orient the objects 192 upright. These upright objects 192 are then transferred by cushion elements at 210 to an upwardly sloping return pair of cushion elements 212, 214 from which the objects 192 are discharged to a return infeed area 216 for return to the stream feed area 196 but in the correct orientation.

Figure 23:
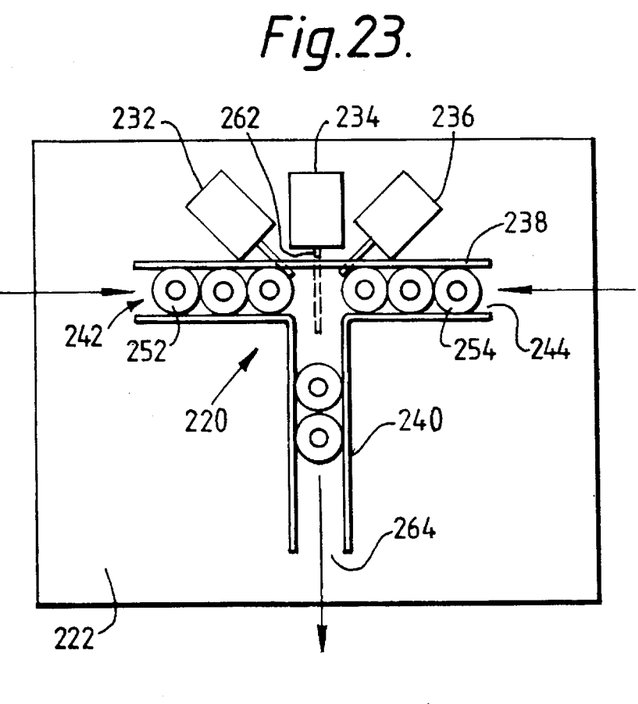
FIG. 23 shows a plan diagrammatic view of a selection apparatus.
Figure 24:
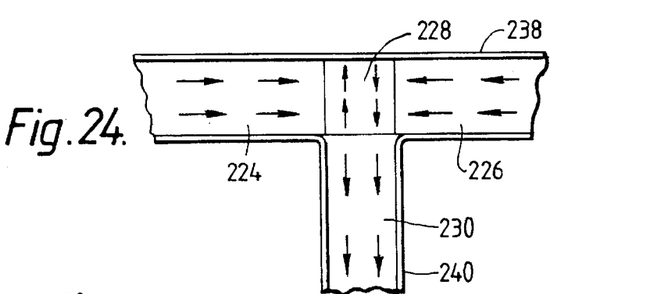
FIGS. 24, 25 and 26 show to an enlarged scale fragmentary portions of FIG. 23.
Figure 25:
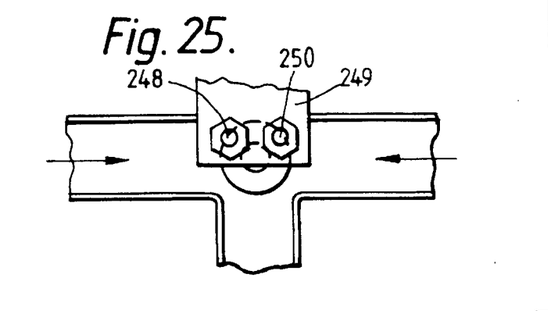
Figure 26:
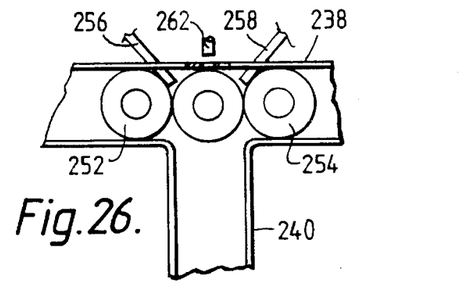

The invention has advantages in alternative selection apparatus, for example as shown in FIGS. 23 to 26 to which reference is now made. In FIG. 23 a Tee-shaped channel 220 is defined on a base 222. As shown in FIG. 24 cushion elements 224, 226, 228 and 230 are attached to the floor of the channel 220, and have their fibres aligned in the directions shown by the arrows. Three actuating devices in the form of electric solenoid assemblies 232, 234, 236 respectively are arranged on the outer upper wall 238 of the channel 220. The central solenoid 234 is aligned centrally with the stem 240 of the channel 220, whilst the solenoids 232, 236 are inclined at 45° to the central solenoid 234 and are positioned so as to be capable of closing the respective entry portions 242, 244 of the channel 220. As shown in FIG. 25, two sensors 248, 250 (e.g. optical fibre photo-electric sensors) on a support 249 (not shown in FIGS. 23, 24, 26) are positioned above the channel 220 at the central cushion element 228.

In operation, for example when it is necessary to feed a controlled selection of hollow cylindrical pellets 252 of one sort (e.g. plain) and hollow cylindrical pellets 254 of another sort (e.g. grooved) held in the respective entry portions 242, 244 the base 222 is vibrated and the solenoids 232, 236 are energised to extend their respective plungers 256, 258 into the entry portions 242, 244 at the junction with the cushion element 228. The plungers 256, 258 act as detents and arrest the flow of the pellets 252, 254 onto the cushion element 228. With the solenoid 234 de-energised, retraction of the respective plunger 256 or 258 allows a selected pellet 252 or 254 to pass to the central cushion element 228. The fibre direction of the central cushion element 228 forces the selected pellet 252 or 254 against the outer wall 238. The sensors 248, 250 confirm that a pellet 252, 254 is located centrally on the cushion element 228 with the respective sensor 248, 250 also confirming from which entry portion 242, 244 the selected pellet 252, 254 has issued. The central solenoid 234 is then energised and its plunger 262 extended to push the selected pellet 252 or 254 to the cushion element 230 from where it is discharged through an exit 264 of the stem 240.

It can be seen that there is little chance of a pellet self-issuing from the exit 264 because of the effect of the direction of the fibres in the central cushion element 228. By appropriate operation of the solenoids 232, 236 a selection of pellets 252, 254 can be made to conform to a desired sequence of pellets 252, 254 to issue from the exit 264.

Figure 27:
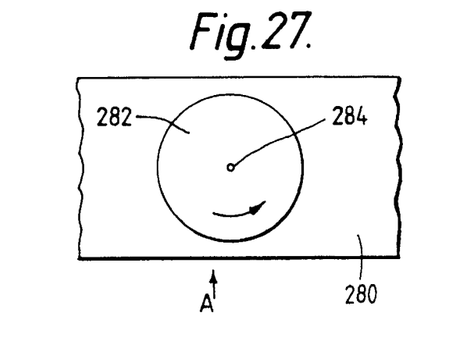
FIG. 27 shows a plan view of a rotary apparatus.
Figure 28:
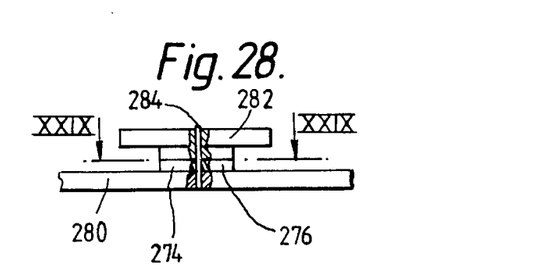
FIG. 28 shows a part-sectional view in the direction of arrow A of FIG. 27.
Figures 29, 30:
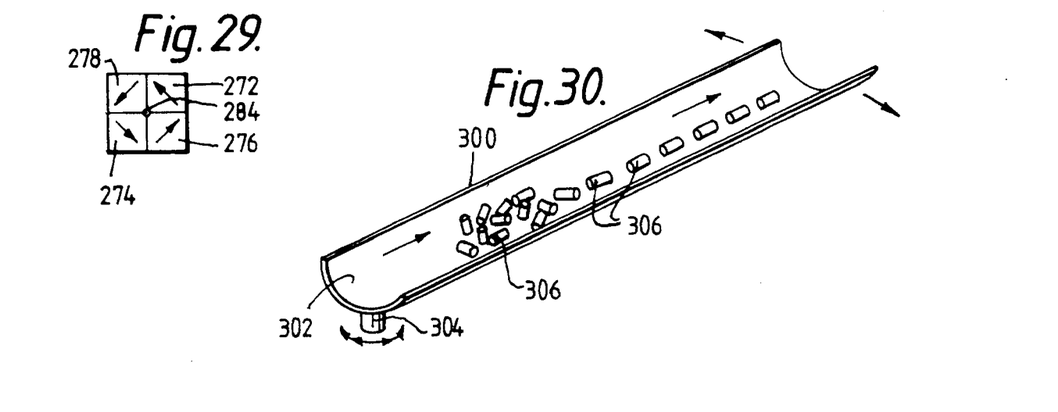
FIG. 29 shows a diagrammatic view on the line XXIX—XXIX of FIG. 28.
FIG. 30 shows a perspective diagrammatic representation of an orientating and spacing apparatus.

The ability of the cushion element of the invention to generate a non-linear motion is shown in FIGS. 27 to 29. Four square portions of cushion elements 272, 274, 276, 278 are shown in FIG. 29 with the directions of inclinations of their fibres as shown by the arrows. The portions 272–278 are attached to a base 280 (see FIG. 28) with their fibres uppermost, and support a shouldered disc 282 through which a central pivot pin 284 extends from the base 280. The disc 282 is a slack fit on the pivot pin 284. When the base 280 is vibrated by a vibrator (not shown) the disc 282 oscillates up and down on the pivot pin 284 and on the cushion elements 272–278, with the result that a rotary motion shown by the arrow is imparted to the disc 282 by the cushion elements 272–278. Such a rotary motion may be used in the apparatus of FIGS. 18 and 19 by fitting the cushion elements 272, 274, 276, 278 of FIG. 29 beneath the disc 164 at 165 and above a stub 167 of FIG. 19.

The cushion elements of the invention may also be used in apparatus for orientating and spacing cylindrical objects, for example as shown in FIG. 30 in which a semi-circular trough 300 is lined with a cushion element 302 with the fibres thereof aligned longitudinally in the direction shown by the single-headed arrows. The trough 300 has a lower pivot 304 about which the trough 300 is arranged to pivot laterally by an oscillation device (not shown). In operation, cylindrical objects 306 are randomly placed in the trough 300 about one third of the length of the trough 300 away from the pivot 304. Lateral pivotal movement of the trough 300 (shown by the double-headed arrows) causes the objects 306 to jostle laterally. The leading objects 306 settle into the bottom of the trough 300 and roll up the sides of the trough 300. In this manner the objects 306 are effectively rolling from side to side across the surface of the cushion element 302 and are, therefore, fed forward in the direction of inclination of the fibres. The further the objects 306 move along the trough 300 the greater the amplitude of oscillation they experience. This has the effect of spacing the leading objects 306, thereby allowing space for any objects 306 held transversely between two neighbouring objects 306 to turn in line with the leading objects 306. In this manner a continuous stream of aligned and spaced objects 306 emerges from the original randomly oriented objects 306.

In all the above examples, conventional vibrator means may be used.

Such vibrators may be obtained for example from:

1. Arthur G Russel & Co Inc Elliott Industrial Estate Arbroath, Scotland, DD11 2NJ or Bristol, Conn. United States The Vibroblock Model VB12-L has been found suitable for some operations.

2. Riley Automation Ltd Forester's Park Derby United Kingdom

The Syntron Vibrator Type V9 has been found suitable for some operations.

The frequencies of the vibrators might be between 50 and 100 Hz for electrical vibrators, although other frequencies (e.g. 150 Hz), and other vibrators such as pneumatic vibrators may be used. For many applications, a vertical peak-to-trough displacement of 0.5 mm has been found satisfactory although other displacements may be used. It may be necessary to use a number of vibrators when elongate cushion elements have to be vibrated.

Although a cushion element having a pile density of $80\times10^6$ fibres per square meter has been aforedescribed, other pile densities such as $68\times10^6$ per square meter may be used. Other cushion elements might be suitable, including other electrostatically precipitated nylon-piled material.

Some resilient suspension or support for the cushion elements may be necessary in some of the applications depending on the size and weight of the transfer apparatus and whether the cushion element or the objects to be transferred are vibrated, but conventional resilient supports may be used such as spring means, elastomeric material, etc.

The invention has many applications, for example in the nuclear industry for the sorting and selection of nuclear fuel pellets. The invention may also be used in the toy and games industry to take advantage, for example, of the complex transfer movements that are possible. Such movements may also have applications in displaying goods in stores and in window displays as well as in other applications.

We claim:

1. A method of smoothly transferring relatively light frangible objects susceptible to weight loss during conveying, said method comprising the steps of:

providing at least one cushion element comprised of a multiplicity of flexible synthetic polymer fibers located in a backing comprising a plastic material, said fibers located at an inclined orientation in the direction of transfer, said fibers having a thickness not greater than about 45 microns, said fibers having similar lengths not greater than about 2.5 mm above said backing and said fibers buttressed against collapse under said object by adjacent fibers, said fibers being packed as an ultra high density pile of at least about $68\times10^6$ fibers per square meter; and vibrating said cushion element and thereby said fibers, said vibration causing said light frangible objects to move along said soft cushion element without damage.

2. A method as claimed in claim 1, wherein the fibres are inclined in the backing at an orientation of at least 70° from the backing.

3. A method as claimed in claim 2, wherein the orientation is about 80° from the backing.

4. A method as claimed in claim 1, wherein the direction of the vibrations is aligned with the required direction of transfer of the objects.

5. A method as claimed in claim 1, wherein the direction of the vibrations is normal to the required direction of transfer of the objects.

6. An apparatus for smoothly transferring relatively light frangible objects susceptible to weight loss during conveying, said apparatus comprising:

a support member;

a soft cushion element locatable on said support member, said soft cushion element comprising a multiplicity of flexible synthetic polymer fibers located in a backing comprising a plastic material, said fibers located in an inclined orientation in the direction of transfer, said fibers having a thickness not greater than about 45 microns, said fibers having similar lengths not greater than about 2.5 mm above the backing material, said fibers buttressed against collapse under said object by adjacent fibers, and said fibers packed as an ultra high density pile of at least $68\times10^6$ fibers per square meter; and means for vibrating said support member and said soft cushion elements, said fiber thickness, said fiber length, said fiber pile density and said means for vibrating comprising a means for causing said frangible objects to move along said cushion element without damage.

7. Apparatus as claimed in claim 6 wherein the vibrating means comprises means for vibrating the support member.

8. An apparatus as claimed in claim 6, wherein the ultra high density pile is of the order of $80\times10^6$ fibres per square meter.

9. An apparatus as claimed in claim 6, wherein the fibres are inclined in the backing at an orientation of at least 70° from the backing.

10. An apparatus as claimed in claim 6 wherein the orientation is about 80° from the backing.

11. An apparatus as claimed in claim 6, wherein the direction of the vibrations is aligned with the required direction of transfer of the objects.

12. An apparatus as claimed in claim 6, wherein the direction of the vibrations is normal to the required direction of transfer of the objects.

13. An apparatus as claimed in claim 6, wherein the direction of the vibrations is inclined to the required direction of transfer of the objects.

14. Apparatus as claimed in claim 6, wherein the vibrating means has a frequency between 50 and 100 Hz.

15. Apparatus as claimed in claim 14, wherein the vibrations from the vibrating means have a peak-to-trough vertical displacement of about 0.5 mm.

16. A method as claimed in claim 1 wherein the fibers have a thickness of between 43 and 45 microns.

17. An apparatus as claimed in claim 6 wherein the fibers have a thickness of between 43 and 45 microns.

18. A method as claimed in claim 1, wherein the direction of the vibrations is inclined to the required direction of transfer of the objects.

19. A method as claimed in claim 1, wherein a plurality of cushion elements are provided in adjacent relationship, and the direction of inclination of the fibers thereof are arranged so that said objects are transferred in a predetermined path.

20. A method as claimed in claim 1, wherein the fibres are vibrated by vibrating a base supporting the cushion element.

21. A method as claimed in claim 1, wherein the vibrations have a frequency between 50 and 100 Hz.

22. An apparatus as claimed in claim 7, wherein the support member comprises one part of complementary interengageable strips, the other said strip being affixed to the backing of the cushion element.

23. An apparatus as claimed in claim 22, wherein the strips comprise magnetic material.

24. An apparatus as claimed in claim 22, wherein the strips comprise complementary hooks and loops comprising plastics material for interlocking when the strips are pressed together.

25. An apparatus as claimed in claim 6, wherein a plurality of portions of said cushion element are located in adjacent relationship on a flat said support member, the directions of inclination of the fibers in the portions being arranged so that in operation an object on the portions follows a predetermined path.

26. An apparatus as claimed in claim 7, wherein the support member comprises a V-shaped track having said cushion element on opposing sides thereof.

27. Apparatus as claimed in claim 26, wherein at least one of the cushion elements has the direction of inclination of said fibers thereof aligned angularly with respect to the length of the track.

28. An inspection system comprising an apparatus as claimed in claim 26, the apparatus having on one side thereof a light source for projecting a beam onto an object on said cushion elements, and on the other side thereof a receiver for detecting light from the light source.

29. Apparatus as claimed in claim 7, wherein a rotatable wheel is disposed above the cushion element and spaced therefrom, the direction of inclination of the fibers in the cushion element being towards the wheel, and the spacing and the direction of rotation of the wheel being such that in operation objects of an acceptable height are diverted from the cushion element by the wheel whilst objects of lower height on the cushion element are able to pass under the wheel.

30. Apparatus as claimed in claim 7 and for orientating cylindrical objects, wherein the support member defines an angular trough, the trough having one side thereof of flat form at a relatively low angle, a side wall at the upper end of said one side, said cushion element on said one side having the fibers thereof inclined angularly towards the side wall and towards an exit end of the trough, and another cushion element at the other side of the trough having the fibers thereof inclined towards the exit end, and a feed cushion element at the other end of the trough near the upper end of the one side, the feed cushion element having the fibers thereof inclined towards the one side for feeding cylindrical objects on to the one side.

31. Apparatus as claimed in claim 30 wherein a lower step is provided at the exit end at the junction between the one side and the other side for re-orientating those said cylindrical objects transferred along said junction, and return cushion elements are provided having the fibers thereof aligned so as to transfer said re-orientated cylindrical objects from the lower step to the feed cushion element.

32. Apparatus as claimed in claim 7, wherein the support member comprises a Tee-shaped channel having cushion elements locatable on the base of the channel, one said cushion element being locatable at the junction between a stem portion and arm portions of the channel, the one said cushion element having the fibers thereof inclined in a direction away from the stem portion, the arm portions having the cushion elements thereof with their fibers inclined towards the one said portion, and the stem portion cushion element having the fibers thereof inclined away from the one portion, and three actuating means locatable outside the channel and each having a respective plunger for displacement into the channel, one said actuating means being locatable so as to displace the plunger thereof generally centrally across the one said cushion element, and the other said actuating means being locatable on either side of the one said actuating means and positioned such as to partially close a respective said arm portion with the plunger thereof extended, whereby objects in the arm portions and released by the respective side actuating means to the one said cushion element may be pushed by the central actuating means plunger across the one said cushion element to the stem portion cushion element.

33. Apparatus as claimed in claim 32, wherein sensing means for detecting the presence of an object on the one said cushion element are provided above the one said cushion element.

34. Apparatus as claimed in claim 6, wherein a plurality of cushion elements are located around a pivot means, and a rotary member is rotatably located on the pivot means, the inclination of the fibers of the cushion elements being aligned with respect to each other such as to impart a rotary motion to the rotary member when the cushion elements are vibrated by the vibrating means.

35. An apparatus as claimed in claim 7, wherein the support member is in the form of an arcuate trough, the cushion element being located in the trough with the fibers thereof uppermost and aligned generally in a direction away from one end of the trough, and pivot means are provided at said one end arranged so that the trough can be pivoted laterally by the vibrating means.

* * * * *